(12) United States Patent
Farrell et al.

(10) Patent No.: US 9,350,694 B2
(45) Date of Patent: May 24, 2016

(54) METHOD AND APPARATUS FOR PROPAGATING ADDRESS CHANGE IN AN EMAIL

(75) Inventors: Colm Farrell, Clonsilla (IE); David M. Ogle, Cary, NC (US); Patrick J. O'Sullivan, Ballsbridge (IE); Hugh P. Smyth, Clontarf (IE)

(73) Assignee: International Business Machines Corporation, Armonk, NY (US)

( * ) Notice: Subject to any disclaimer, the term of this patent is extended or adjusted under 35 U.S.C. 154(b) by 2173 days.

(21) Appl. No.: 11/423,472

(22) Filed: Jun. 12, 2006

(65) Prior Publication Data

US 2007/0124394 A1    May 31, 2007

(30) Foreign Application Priority Data

Nov. 30, 2005    (GB) .................................. 0524350.6

(51) Int. Cl.
    *G06F 15/16*    (2006.01)
    *H04L 12/58*    (2006.01)
    *G06Q 10/10*    (2012.01)

(52) U.S. Cl.
    CPC .............. *H04L 51/28* (2013.01); *G06Q 10/107* (2013.01); *H04L 51/30* (2013.01)

(58) Field of Classification Search
    USPC .......................................................... 709/206
    See application file for complete search history.

(56) References Cited

U.S. PATENT DOCUMENTS

| | | | |
|---|---|---|---|
| 6,161,137 A | 12/2000 | Ogdon et al. | |
| 6,564,264 B1 * | 5/2003 | Creswell et al. | ............. 709/245 |
| 6,598,075 B1 | 7/2003 | Ogdon et al. | |
| 6,654,779 B1 * | 11/2003 | Tsuei | ............................. 718/101 |
| 6,760,749 B1 | 7/2004 | Dunlap et al. | |
| 6,779,178 B1 * | 8/2004 | Lloyd et al. | .................... 717/174 |
| 6,957,248 B2 * | 10/2005 | Quine et al. | ................... 709/206 |
| 7,197,461 B1 * | 3/2007 | Eberle et al. | .................. 704/275 |
| 7,254,573 B2 * | 8/2007 | Burke | |
| 7,360,165 B2 * | 4/2008 | Cortright et al. | .............. 715/752 |
| 7,543,026 B2 * | 6/2009 | Quine et al. | ................... 709/206 |
| 7,788,325 B1 * | 8/2010 | Glidden et al. | ................ 709/206 |
| 2001/0032137 A1 * | 10/2001 | Bennett et al. | ................... 705/14 |
| 2002/0042815 A1 * | 4/2002 | Salzfass et al. | ............... 709/206 |
| 2002/0059425 A1 * | 5/2002 | Belfiore et al. | ............... 709/226 |
| 2002/0112015 A1 * | 8/2002 | Haynes | ......................... 709/206 |
| 2002/0120697 A1 * | 8/2002 | Generous et al. | ............. 709/206 |
| 2002/0143879 A1 * | 10/2002 | Sommerer | ..................... 709/206 |
| 2002/0188690 A1 * | 12/2002 | Lee | ................................. 709/206 |
| 2003/0009385 A1 * | 1/2003 | Tucciarone et al. | ............ 705/26 |
| 2003/0065726 A1 * | 4/2003 | Wells et al. | .................... 709/206 |
| 2003/0069887 A1 * | 4/2003 | Lucovsky et al. | ............... 707/10 |
| 2003/0182310 A1 * | 9/2003 | Charnock et al. | .......... 707/104.1 |
| 2004/0066404 A1 * | 4/2004 | Malik et al. | .................... 345/752 |
| 2004/0103162 A1 | 5/2004 | Meister et al. | |
| 2004/0215784 A1 | 10/2004 | Qi et al. | |

(Continued)

*Primary Examiner* — Ninos Donabed
*Assistant Examiner* — Thomas Richardson
(74) *Attorney, Agent, or Firm* — Edward Choi; Hoffman Warnick LLC (57) ABSTRACT

There is provided a system, method and computer program product for managing an email comprising a plurality of email boxes with corresponding email addresses; a first selector for selecting, in one email box, an email that has been sent to at least one addressee; a second selector for selecting an incorrect email address in the sent email corresponding to an incorrect addressee; a change service for changing, in the sent email, the incorrect address to the correct address; and a distributor for making the change service available to at least one recipient box.

11 Claims, 3 Drawing Sheets

(56) References Cited

U.S. PATENT DOCUMENTS

| | | | |
|---|---|---|---|
| 2004/0236749 A1* | 11/2004 | Cortright et al. | 707/9 |
| 2005/0108208 A1* | 5/2005 | Aoki | 707/3 |
| 2005/0228899 A1* | 10/2005 | Wendkos et al. | 709/232 |
| 2005/0246415 A1* | 11/2005 | Belfiore et al. | 709/203 |
| 2005/0278430 A1* | 12/2005 | Cato | 709/206 |
| 2006/0212522 A1* | 9/2006 | Walter et al. | 709/206 |
| 2007/0005713 A1* | 1/2007 | LeVasseur et al. | 709/206 |
| 2007/0011252 A1* | 1/2007 | Taylor | 709/206 |

* cited by examiner

METHOD AND APPARATUS FOR PROPAGATING ADDRESS CHANGE IN AN EMAIL

FIELD OF THE INVENTION

This invention relates to a method and apparatus for propagating a change in an email. In particular this invention relates to a method and apparatus for propagating a change of addressee in an existing email to other corresponding copies of the email.

BACKGROUND OF THE INVENTION

In conventional email systems an individual sending email ("the sender") can fulfil an intention to send an electronic email to one or a number of persons (the "receiver"). Typically this happens when the subject matter of the message is of interest to the receiver, or when the sender deems that such information is pertinent to the receiver.

In conventional art the outset intention of the sender to identify a receiver for an email is not always realized to the satisfaction or intention of the sender. Oftentimes an incorrect receiver is identified and errors can occur. A single incorrect addressee in one email can result in many further incorrectly sent emails after the original email is sent, replied to, further replied to, forwarded and subsequent threads associated with the initial thread established by the sender. It is desirable to eliminate this class of error.

Corporate directories are used to record the list of employees that an organisation has. In some large organisations, for speed and local access reasons, the corporate directory is replicated or available in each of the countries that the organisation may have, for example, in IBM Lotus Notes®, the corporate directory maybe be replicated in total (so all entries in all geographies) or in part (the local directory may have the entries associated with the organisational unit, and cascading of other organisational units done programmatically by network referral to the other organisations). In organisations like IBM a central directory (e.g., bluepages) can be replicated in its entirety—simply through cloning of the Lightweight Directory Access Protocol (LDAP) directory, or simply accessed by all centrally. IBM, Lotus, and Lotus Notes, are registered trademarks of IBM Corporation in the United States, other countries or both.

In many cases individuals can have the same name, an example is the number of David Smiths in New York or Pat O'Murphys in Dublin. This is referred to as "common name" in LDAP terminology. In some Asia Pacific countries, cultural nuances are such that individuals are more likely to be named after popular names and the number of individuals with the same/similar name is much higher than in Western countries. Individuals in an organisation with the same or similar LDAP "common name" frequently receive emails that are not intended for them. For example, Pat O'Murphy is a Test Architect in Dublin (let's call him Pat-A). There is also another Pat O'Murphy in Dublin who is a finance manager (Let's call him Pat-B). On a weekly basis Pat-A receives approximately 20-30 emails intended for Pat-B. A number of these contain private and confidential data (e.g. salary details of employees, personnel action notices, acquisition information, organisational data intended for senior managers/directors). Clearly, Pat-A should not be receiving these emails. Likewise Pat-B receives emails intended for Pat-A. The current solution is for one Pat to forward the emails to the other Pat and correct the original sender by advising "you have copied the incorrect individual, please copy the correct gent in the future". Similarly, for example, there may be a team in Winchester that has two David Smiths, one in Test and one in Development and they may sit a few desks apart and work on the same team. These gents see a greater frequency of error in terms of being on the wrong email. Assuming that there is another David Smith somewhere else in the organisation then all three would get more incorrect emails than the two Pat O'Murphys. Sometimes, a David may actually reply to another David's emails and, if an already existing context applies, then the response can motive regression as the new reply from the wrong person misses this context. Broadly speaking, in a large organisation there can be several thousand errors associated with name collision in email and calendar invitations. Oftentimes confidential information is sent to the wrong persons. Also, time and opportunity are lost due to latency.

Sending an email to one incorrect receiver is a single problem corrected when the correct receiver is identified. However, if the original email was copied then further instances of an incorrectly copied email can occur and re-occur indefinitely. If an incorrect addressee were diligent then each incorrectly addressed email received would be corrected and in Pat O'Murphy's case this might mean several hundred emails in a year.

There is also "historical latency", where a thread that was corrected (as described above) may sit dormant for some time. An individual on that thread may need to use past contacts, and may resurrect any of the original threads that copied an incorrect receiver. That thread and all subsequent threads will effectively mature the same class of problems that the incorrect receiver may have already attempted to correct. When an incorrect receiver is copied the correct receiver is unaware (until corrected by the incorrect receiver) that an error has happened. If this individual is on vacation, out of the office, sick and so on then the correct receiver is oblivious to an action or set of actions that were intended for them. Time can be lost, opportunity can be missed and subsequent frustration can grow where the sender does not get a response to an reply, or repeated attempts to achieve a response.

Correcting the sender on the first occasion does not suffice. Specifically, receivers have noted that senders make the same mistake over and over again due to human error and forgetfulness. The larger the organisation, the higher the probability of name collision. Conventional email groupware systems allow a person to send an email to a recipient address found in a groupware directory. A person who wishes to send an email, will have an email account, an email client and access to the group directory. People are generally known by their common name, e.g. "John Doe". When the sender wishes to send an email to a recipient, "John Doe", the sender enters "John Doe", into the "To" field of the email form, completes the subject line and body field and then clicks the send button. The email program locates the nearest address match in the directory and forwards the email to the matched recipient.

In such groupware email systems an organisation stores its people information as person records in a directory (for instance an LDAP directory). Each person has a number of attribute fields associated with their person record. One attribute, the common name, will contain "John Doe". The common name is the name by which most if not all people are known. The directory system may allow multiple common names for the same person. Pertinently, the one attribute that distinguishes individuals in an LDAP directory is the DN (Distinguished Name). This name is more likely to be unique in the LDAP directory because it can be made up of other attributes: UID (universal id); C (country); OU (organisational unit); O (organisation). For example, dn: (uid=771803897, c=us, ou=bluepages, o=ibm.com).

Subsequently, an organisation can have several people who have the same common name, and generally administrators add an initial or alternative to distinguish the common name, for example "John A Doe". This is useful if the Sender of the email knows that the middle initial of the recipient has been assigned. However, the majority of senders will just use "John Doe" in the To field of the email as this is how they conventionally know and address the individual either professionally, amongst peers, or socially. The email will be sent and may be received by the wrong "John Doe". If the "John Doe" who receives this email tries to send on the email to the intended recipient it can be a hit and miss process. Most likely, the wrong "John Doe" just returns the email to the sender with comments like "I think you sent this email to the wrong person".

One solution to incorrectly sent emails is to have individuals use a person's distinguished name in sending email. Instead of using "John Doe" they could instead use the UID "771803897". However, this is not desirable by users who have to substitute common names that are used daily with names that cannot be remembered.

The state of the art that goes part way to solving the problem can be seen in IBM Lotus Notes by way of a "look ahead" capability. When the sender is typing in the receiver's name the "look ahead" will identify individuals with the same common name, and the sender can select one of these names. However, even with this in place the above problems are not addressed. For example, when a user is offline the "look ahead" capability is not available so no prompting occurs. Also, when the degree of overlap with the receiver's name is closest to a server-side (LDAP) fuzzy-matched resolution no options are present and an immediate resolution based on a "good match" is returned (which may be the wrong person). This may explain why David Smith and Pat O'Murphy are consistently frustrated by the same problems associated with receiving emails not intended for them.

Another workaround demonstrated in Lotus Notes is that the sender can motivate a permanent correction by adding the correct name to their personal address book. However, problems can still occur in instances where matching may resolve names outside of this list due to a best-fit programmatically being established first elsewhere (server side). Regardless, personal address books are generally used by individuals to add names of "friends" and to facilitate abbreviations. For example, a user may choose to add "Xiao Hei Wu/China" as "David" as this is the name he goes by and that the user is familiar with. When the user subsequently sends emails to "David" this gets resolved to the exact substitution places in the personal names and address book as "Xiao Hei Wi/China".

Prior art software permits situations where the class of problems described above happen and in repeated ways. On the basis that common name collision is inherent in society and organisations it is fair to say that there are cost, time, opportunity, frustration, and latency problems associated with existing systems and methods for routing email that do not address the problem of name collision. It is the purpose of this invention to solve this.

The system and method used for describing common, distinguished, organisational, hierarchical and other parameters associated with a user's name is in the main generally consistent within prior art corporate directories. What differs is the means of extracting information and the programmatic methodology used to interrogate these.

To implement a change in the architecture of an existing corporate directory would not solve the above problems if an email system used more than more than one directory. Existing LDAP systems are established and have been in existence for some time and explore the solution from the perspective of the email system. This makes sense if it is considered that email systems are used by individuals that can be "offline", and at that point in time will not have access to their conventional LDAP directory in non-connected mode.

US patent publication 2002/0188690-A1 describes a system and method for checking, validating and correcting email addresses so as to transmit email to an accurate host name's email account holder. The method of correction is a systematic parsing of the email address followed by validation of the substring components in an intelligent way. A validation of the remote domain and validation of a destination user in that domain to derive a successful end result (email arriving). This is intended primarily to pre-empt and solve problems in the area of delivery failures due to malformed email addresses such that a valid email address is reinforced and propagated on behalf of the user.

US patent publication 2004/0103162-A1 describes a system and method that alerts/warns a user of an email system of the addresses of an email message after the act of sending has been selected and before the action of send has been motivated. The art essentially represents an interim validation of the message addresses and permits both an intermediate validation and correction step to the user which may result in a manual correction to the addressees as well as a cancel. The art also describes a set of circumstances where such an interception is desired and needed.

SUMMARY OF THE INVENTION

According to a first aspect of the present invention there is provided a system of managing emails comprising: a plurality of email boxes with corresponding email addresses; a first selector for selecting, in one email box, an email that has been sent to at least one addressee; a second selector for selecting an incorrect email address in the sent email corresponding to an incorrect addressee; and a change service for changing, in the sent email or corresponding sent email, the incorrect address to a correct address.

In an alternate client server embodiment the change service is a change executable for changing, in the sent email or corresponding sent email, the incorrect address to the correct address.

In one embodiment, a distributor may make available the change service to at least one recipient email box, whereon execution of the change service, the incorrect address in a corresponding sent email is changed to the correct email address. Therefore in this embodiment the distributor allows all other mail box access to the one service.

In an alternate embodiment the distributor may make available the change executable by sending an executable embedded in an email from the one email box to at least one another email box on a client; the at least one executable is normally for execution on selection by the recipient but could also execute once received.

The system advantageously comprises a third selector for selecting, on execution of the change service, a correct email address. Alternatively, the correct email address is selected before the change service in instantiated.

More advantageously the system further comprises permission means for requesting permission from the recipient email client before executing the change service. Alternatively, the change service may execute without permission on receipt at the recipient email client.

The system may further comprise sending a monitor service to the recipient email client with the change service, on execution of the monitor service, checking for the incorrect addressee in email on the recipient email client and, on detection of the incorrect addressee, initiating the change executable. The monitor executable executes on receipt by default but can be switched on or off.

According to a second aspect of the invention there is provided a method of managing an email system comprising a plurality of email boxes with corresponding email addresses; selecting, in one email box, an email that has been sent to at least one addressee; selecting an incorrect email address in the sent email corresponding to an incorrect addressee; and providing a change service for changing, in the sent email or one or more corresponding sent emails, the incorrect address to a correct address.

BRIEF DESCRIPTION OF THE DRAWINGS

Embodiments of the invention will now be described, by means of example only, with reference to the accompanying drawings.

DETAILED DESCRIPTION OF THE DRAWINGS

Figure 1A:
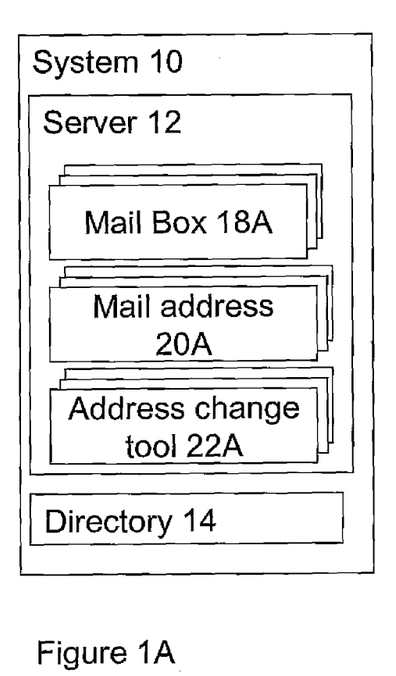
FIG. 1A is a schematic of a server email system of an embodiment of the invention.
Figure 1B:
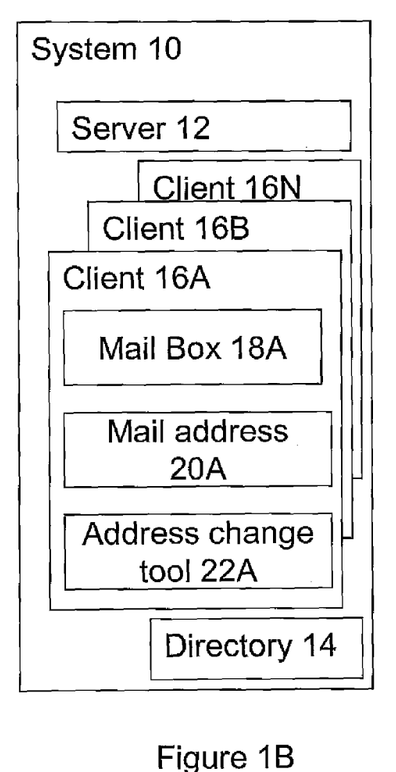
FIG. 1B is a schematic of a client based email system of another embodiment of the invention.

As shown in FIGS. 1A and 1B, an embodiment of email system 10 comprises: an email server 12, a directory 14, and a plurality of email boxes 18A, 18B, . . . 18N, each with corresponding email address 20A, 20B and 20N. An address change tool 22 is available in all of the email boxes 18A, 18B, . . . 18N. The embodiment is a server based email system where the email boxes 18A, 18B, . . . 18N are located in the server (see FIG. 1A). However, an alternative embodiment is a client based email system where email boxes 18A, 18B, . . . 18N are located in clients 16A, 16B, 16N (see FIG. 1B).

Figure 2:
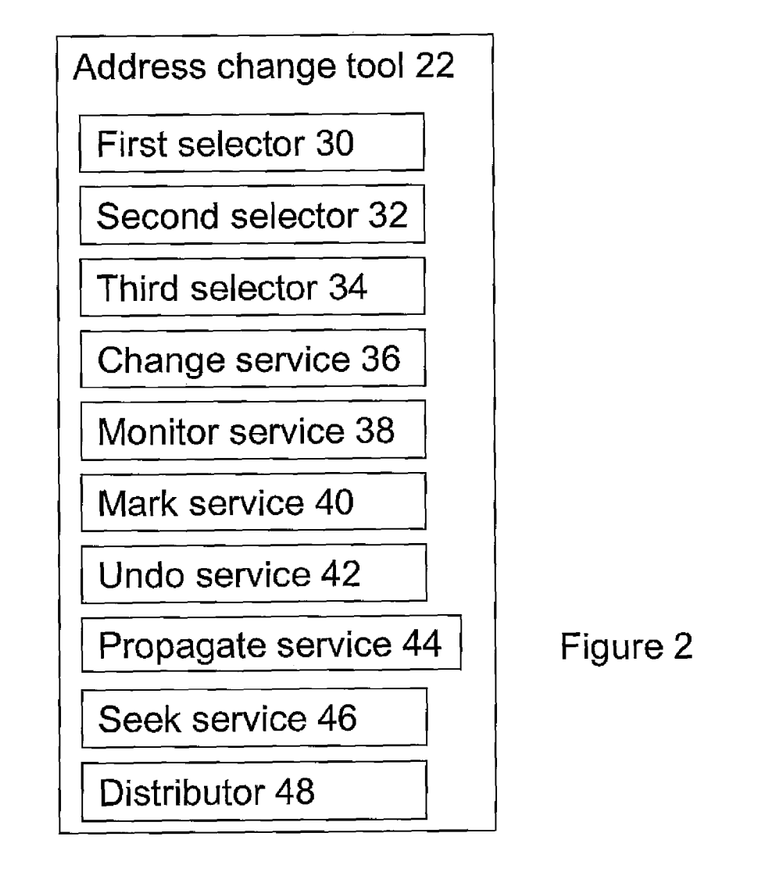
FIG. 2 is a schematic of an address change tool of the invention.

Referring now to FIG. 2, in the embodiment, each address change tool 22 comprises: a first selector 30; a second selector 32; a third selector 34; a change service 36; a monitor service 38; a mark service 40; an undo service 42; a propagate service 44; a seek service 46; and a distributor 48.

The first selector 30 is for selecting a sent email in an email box 18A (sent in the sense that it has been sent and received somewhere, in this example the sent email has been received into the email box 18 of a recipient or is in the email box of the sender as a sent email). In this case the sent email comprises the email addresses of an email sender and email recipients and one of the email recipients addresses is incorrect. It is desired to exchange the incorrect email address for a correct email address. An email box user is an initiator of the address change tool 22, for example, an incorrect recipient user or the sender user as initiator, could control the first selector to select the email (the selected email).

The second selector 32 is for selecting an incorrect email address in the sent email, for example the email address of the incorrect recipient. The initiator would control the second selector 32 to make the selection.

The third selector 34 is for selecting a correct email address, for example the email address of the correct recipient. In the embodiment the selection of the correct email address is performed by the change service 36 in cooperation with an email box in which the change executable is executing. However the third selector 34 can also be controlled by the initiator who knows the correct recipient and who selects a new email address before the change executable is sent.

The change service 36 is for performing the selection steps and to change, in the sent email, the incorrect email address to the correct email address. The change service 36 is sent back to at least one addressee in the email and normally the email sender address. On execution of the change service 36 at an email box, a correct email address is selected by the email box user and the incorrect email address in the email or a corresponding email is changed to the correct email address. The change service 36 may also be executed on the initiator's email box but in the case that the initiator is the incorrect addressee then this is unnecessary.

The monitor service 38 is for checking for the incorrect email address in a new or existing email and, on detection of the incorrect addressee and with permission from the email client user, initiating the change service 36. The monitor service 38 executes on receipt by default but can be switched on or off by the email box user.

The mark service 40 is for marking the changed email to indicate that a change has been made. The undo service 42 is undoing the change made by the change service 36. The email box user can initiate the undo service 42 after the change has been made.

The propagate service 44 is for making available the executable to other email boxes that were not in the original distribution. In the embodiment the propagate service 44 selects all addressees not in the original distribution, normally those other than the recipient address and sender address. The propagate service 44 is normally made available by the incorrect receiver of an email back to the original sender so that the original sender can decide whether to activate it and make the correction available to other recipients of the email.

In another embodiment, the propagate service 44 selects recipients in the email sender's organisation hierarchy by checking in directory 14, which contains an organisation hierarchy including email addresses. This allows the services to be made available to email addresses that are not found in the email. Co-workers of the sender located in a company directory have access to the service. Also email addresses from the sender's address book may be manually or automatically selected. Furthermore, employees of the sender may be automatically selected for having access to the change service 36.

The seek service 46 is for seeking other emails which are linked to the selected email, prompting the user regarding the linked emails, and performing, with permission, the same change.

The distributor 48 is for making the services available to at least one other email box in the first instance. In the second instance the propagator makes the service available. In the case of the incorrect addressee being the initiator then only the sender email box is normally selected but the initiator can select more or fewer email addresses. Addresses not selected for distribution are saved for the propagation service.

The method of an embodiment of the invention will be described with respect to steps shown in FIG. 3A, FIG. 3B and FIG. 3C.

Figure 3A:
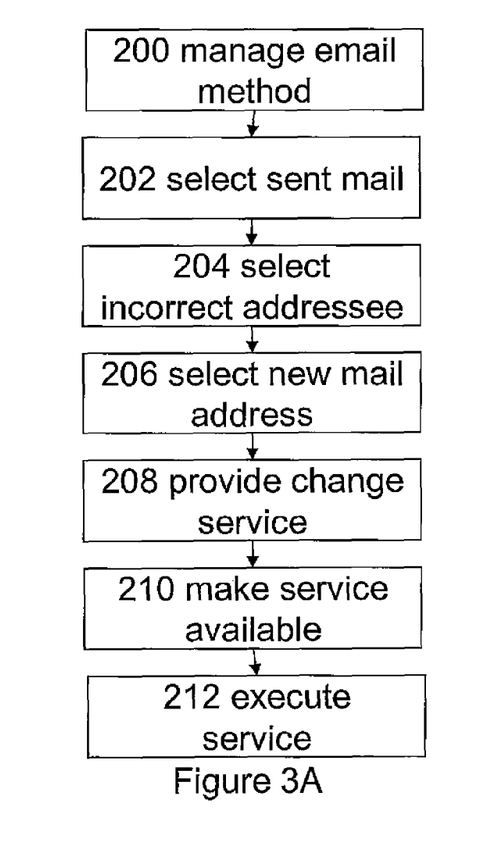
FIGS. 3A, 3B and 3C are schematic of methods of address change tool methods including: a manage email method; a monitor executable; and a change executable, respectively.
Figure 3B:
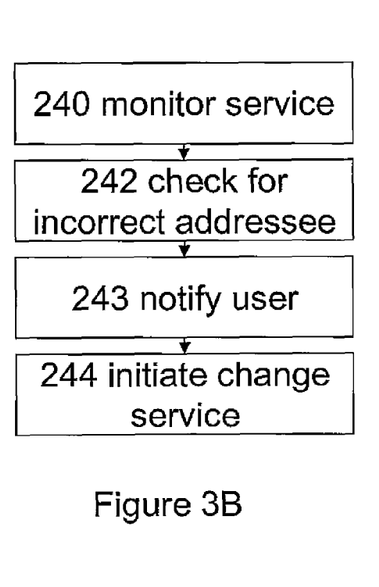
Figure 3C:
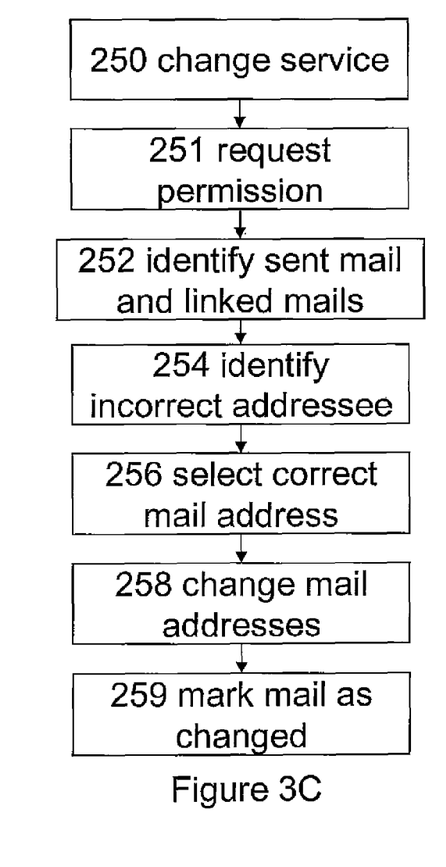

FIG. 3A shows the steps of manage email method 200. The address change tool 22 is initiated by a user at an email box that has incorrectly received email (referred to as the sent email). The first selector 30 prompts the user to select (202), in the user's email box, a sent email (alternatively the user may select the email and initiate the address change tool 22 in a single step). The second selector 32 prompts the user to select (204) an email address of an existing addressee in the sent email. A new email address is selected (206) by the email sender when prompted by the third selector 34 during the change service. However, the user may also select a new email address.

Next, the services are made available (208). The change service 36 is instantiated for performing the selecting steps above and for changing, in the sent email, the incorrect email address to the correct email address. The monitor service 38, mark service 40, undo service 42, propagate service 44 and seek service 46 are all instantiated to create their respective services.

Next, the distributor 48 makes available (210) the service to at least one email box whereon execution (212) of the change service 36 at the email box, the incorrect addressee in a corresponding sent email is changed to the correct email address. In another embodiment the services are made available to related email boxes found in a central directory, e.g. other members of the same department.

The method (240) of execution of the monitor service 38 on an email box will now be described with reference to FIG. 3B. In step 242, the monitor service 38 checks all email for the presence of the incorrect addressee corresponding to the selected incorrect addressee in step 204 performed on a different email box. All email includes sent, received, draft or in progress email. In step 243, the monitor service notifies the email box user of the existence of an incorrect addressee and prompts (244) the user to execute the change service 36.

The method (250) of execution of the change service 36 will be described with reference to FIG. 3C. In the first step (251) the change service 36 requests permission (251) from the email box user on which it is executing (if permission has not already been granted to the monitor service 38). Next, the change service 36 identifies (252) the sent email corresponding to the selected email in previous step 202 performed at the email recipient box. Other linked emails may be identified at this stage. Next, the change service 36 identifies (254) the incorrect addressee corresponding to the selection in previous step 204. Next, the change service 36 prompts the client user to select (256) a new email address if this has not already been selected in step 206. Next, the change service 36 exchanges (258) the incorrect email address for the correct email address. Next, the mark service 40 marks (259) the email as changed.

The following example will illustrate the invention. The sender, in a conventional way, identifies a number of recipients and sends an email to John Smith and Pat B Murphy. One of these recipients is incorrectly targeted, say Pat B Murphy, and becomes the basis for a correction. The receiver, Pat B, on receiving the email and realising the need for a correction, selects the address change tool 22 of the embodiment and notifies the sender that 1) there is a potential error, and 2) the error can be corrected on initiation of a change executable.

When the receiver, Pat B, receives an email and selects the address change tool 22, an option to "Propagate Addressee Correction" can be selected on the open email or calendar entry. In this example, the receiver does not select a new email address and leaves this to the sender. After selecting "Propagate Addressee Correction", the sender is notified by the monitor service 38: (1) to make aware of the initial error; (2) to permit a new email address selection, Pat A Murphy, and facilitate a correction through the change service 36; and (3) to permit the change service 36 to be propagated to other recipients, John Smith, by using the propagate service 44.

The correction matures to a sender dialog box or form that gets populated with the new email address, Pat B. This can be also auto-populated by knowledge from the receiver, or overwritten/established by the sender. Being persistent while the monitor executable is running, the sender gets prompted in a way that forces the action to be addressed, for example, each time the email file is opened.

The new email address is saved by the monitor service and the next time the sender sends an email that targets the incorrect receiver he is prompted with a correction dialog that says "The last occasion that you sent an email to this recipient it was incorrect. Auto correction has proposed <Pat B Murphy> as the correct recipient. Do you will to override your selection with <Pat B Murphy> on this occasion?"

The sender is permitted to select affirmative to "Do you wish to suppress this message from here on in and have auto correction for this user applied automatically from here on in?". Assuming "yes" the subsequent errors are automatically corrected by the monitor service. Assuming "No" the specific instance of correction is rejected. Assuming "Delete", then the correction record is deleted (as it may be an error in that the receiver was the correct person after all, or may no longer be required). Assuming that the sender accepts the correction and then accepts the propagation then the change service is distributed to the email boxes of each user copied on the email.

As described above a sent email can be corrected in a persistent way. The receiver can select a "Propagate Addressee Correction" option. When this is actioned by the sender the change executable is propagated to all other addresses in the email and related emails.

Although the present invention describes emails in this embodiment, the same principles will work for other types of data object that have email address fields susceptible to error (e.g. calendar objects).

One embodiment of the invention is a server side embodiment in which the service runs on an email server accessed by thin clients. The same principles apply for client based email where the service are executables on individual clients. An embodiment can be envisioned in which services or executables can run on the client or server depending on whether the user is accessing a client or server copy of the emails.

In this way each and every individual copied on the email will benefit from the correction propagation and the initial incorrect recipient will not be frustrated from further emails on this thread.

Another embodiment of the invention is a light client running from a browser on a client machine, but which is not installed in the conventional way. Such a light client would run on a mobile phone or personal digital assistant. A light client downloads email data and stores it on a client machine, but uses a email services, for instance Lotus Domino® Offline Services, to create, address and edit emails on or off-line (Domino is a registered trademark of IBM Corporation in the United States and/or other countries.) On a light client having no installed client application, the change service may be provided as a local service or as local executable.

In the alternative embodiment, executables are described in generic form that perform much of the function, for instance, monitor executable and change executable. However, in other embodiments, executables can be written in the form of: methods, classes, or objects; methods of classes and objects; procedures; scripts; macros; applets; programs; or windows executables including ActiveX objects (ActiveX is a trademark of Microsoft Corporation in the United States and/or other countries).

The organisational distance between users that can be derived from interrogating a corporate directory makes sure that change corrections to emails addresses for one set of users would not be prompted for other sets of users. For example, Philip may want to be prompted for changes in his department that Pat would not want to see and vice versa. The organisation distance between Pat and Philip is such that your tree or hierarchy can be positioned as mutually exclusive to mine and vice versa.

In one or more of the embodiments of the invention, a database stores change corrections and the ultimate beneficiaries of changes. For example, a data record stores additional information to say that "only this named user will benefit from this change", or "only this group of people will benefit from this change", or "only this department will benefit from this change", or "the entire company will benefit from this change". This will allow implementation of the peer-peer, group, department and divisional propagations. In so doing the corporate LDAP will be used to establish and respect the organisational distances between individuals and groups A user can have changes or corrections forced on them by the monitor executable. For example, an administrator may decide that a change needs to be respected for all instances of a specific case. In respecting this, a database of corrections will record such corrections and these will be made passively to the user, and potentially without their consent.

As well as a user propagating changes to a central database, a user can propagate the change to a database that resides on a peer's computer, where a peer could be one or more persons identified by the user or all persons in the department that the user decides. This can be recorded in the central database of changes but recorded in a way that implies that only the selected individuals will benefit from future changes of same. In such a case only the database on the peer's computer would be updated/propagated to.

When a user is working offline and disconnected from the central DB of corrections it is possible for changes to be made using a replica local copy of the central database. This local replica is synchronised using conventional tools.

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be further appreciated that embodiments of the present invention may be provided in the form of a service deployed on behalf of a customer to offer service on demand.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. A system for managing emails comprising:
a computing system having at least one computer device, including:
a plurality of email boxes with corresponding email addresses;
a first selector for selecting, by a user, an email in one email box that has been sent to a plurality of addressees;
a second selector for selecting, by the user, an incorrect email address in the email corresponding to an incorrect addressee, the incorrect email address being a valid email address for a person other than an intended recipient;
a change service for changing, in the sent email or a corresponding sent email, the incorrect email address to a correct email address;
a seek service for, in response to the changing, seeking other emails in the email box that are linked to the sent email and which include the incorrect addressee and for selectively changing each occurrence of the incorrect email address in each linked email to the correct email address; and
a distributor for, in response to the changing, making available the change service to at least one other email box that received the sent email or a corresponding sent email, or that contains an email linked to the sent email, wherein, on execution of the change service in the other email box, selectively changing each occurrence of the incorrect email address to the correct email address in the sent email, each corresponding sent email, and each linked email.

2. A system according to claim 1 wherein the change service is a change executable for changing, in the sent email or corresponding sent email, the incorrect email address to the correct email address.

3. A system according to claim 1 further comprising:
a third selector for selecting, on execution of the change service, a correct email address.

4. A system according to claim 1 further comprising:
a permission service for requesting permission from a recipient email box user before executing the change service at the recipient email box.

5. A system according to claim 1 further comprising:
a monitor service available to the recipient email box with the change service, wherein, on execution of the monitor service, the monitor service checks for the incorrect addressee in email on the recipient email client and, on detection of the incorrect addressee, initiates the change service.

6. A system according to claim 1 wherein the initiation of the change service is initiated by a recipient of the sent email and made available to the sender of the sent email or it is initiated by a sender of the sent email and made available to at least one addressee email client.

7. A system according to claim 5 wherein the change service and monitor service are made available to recipients located in a central email directory.

8. A system according to claim 1 further comprising:
a mark service for marking the changed email to indicate that a change has been made.

9. A system according to claim 1 further comprising:
an undo service for undoing the change and for making available with the change service whereon execution of the undo service a change is undone.

10. A system according to claim 1 further comprising:
a propagate service for making available the services to the other email addresses.

11. A computer program product comprising non-transitory computer readable storage medium having computer readable code stored thereon for managing an email system comprising a plurality of email boxes with corresponding email addresses, said computer readable code, which when loaded onto a computer system and executed, performs the steps of:
- selecting, by a user, an email in one email box that has been sent to a plurality of addressees;
- selecting, by the user, an incorrect email address in the email corresponding to an incorrect addressee, the incorrect email address being a valid email address for a person other than an intended recipient;
- providing a change service for changing, in the sent email or one or more corresponding sent emails, the incorrect email address to a correct email address;
- seeking, in response to the changing, other emails in the email box that are linked to the sent email and which include the incorrect addressee and selectively changing each occurrence of the incorrect email address in each linked email to the correct email address; and
- providing, in response to the changing, the change service to at least one other email box that received the sent email or a corresponding sent email, or that contains an email linked to the sent email, wherein, on execution of the change service in the other email box, selectively changing each occurrence of the incorrect email address to the correct email address in the sent email, each corresponding sent email, and each linked email.

* * * * *